Aug. 3, 1965   W. F. GESELL   3,198,431
FLUID MIXING SYSTEM
Filed Jan. 4, 1963

INVENTOR.
W. F. Gesell
BY
Edward F. Noe
ATTORNEY

United States Patent Office 3,198,431
Patented Aug. 3, 1965

3,198,431
FLUID MIXING SYSTEM
William F. Gesell, Fairborn, Ohio, assignor to The Sheffield Corporation, Dayton, Ohio, a corporation of Delaware
Filed Jan. 4, 1963, Ser. No. 249,519
10 Claims. (Cl. 236—13)

This invention relates to fluid systems and more specifically to fluid mixing systems.

One object of the invention is the provision of a fluid system for mixing fluid supplies, each supply being provided with a mixing device which proportions a desired amount of fluid to be mixed without using any moving parts.

Another object of the invention is the provision, in a system of the character mentioned, of a fluid mixing system which can be controlled precisely and with a minimum expenditure of control power.

Another object of the invention is the provision, in a system of the character mentioned using air as the fluid, of precise mixed air temperature control throughout a desired adjustment range.

Another object of the invention is the provision, in a system of the character mentioned, of an air temperature control system which is inexpensive to fabricate.

Another object of the invention is the provision, in a system of the character mentioned, of a system for mixing air streams in a motor vehicle which are at different temperatures and controlling the temperature of the mixture by control of the amount of each stream flowing into a mixture chamber.

Other objects and advantages of the invention will be apparent from the following description, the appended claims and the accompanying drawings, in which, FIG. 1 shows the system of this invention in its application to a motor vehicle.

Figure 1:
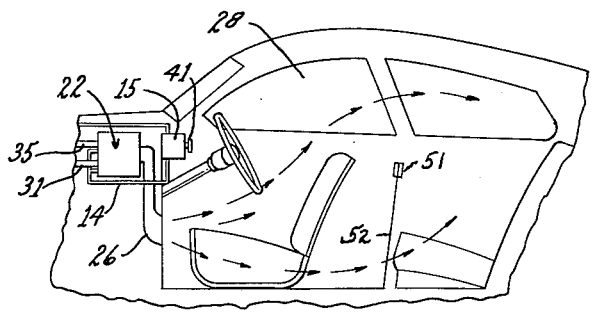

In accordance with the present invention a system is provided for mixing two fluids having different fluid characteristics using a composite valve arrangement having no moving parts. Fluid is provided to a valve 2, illustrated in FIG. 2 of the drawing, through a supply passage 3 connected to one of the fluid sources which generates a fluid stream that is discharged from the valve through a main discharge passage 5 and an auxiliary discharge passage 6. An orifice 7 is provided in the valve to flow fluid in a direction generally transverse to the fluid stream, thereby imposing a force on the steram to deflect the stream in different proportions through its discharge passages in accordance with the flow through the orifice. A second fluid, having characteristics different from the first fluid, is provided to a second valve 10 through a second supply passage 11 which generates a second fluid stream and is discharged from the second valve through the main discharge passage 5, communicating with the main discharge passage of the first valve, and an auxiliary discharge passage 12 in the second valve. A second orifice 13 is provided for flowing fluid in a direction generally transverse to the second stream, but this second orifice is arranged to deflect the second stream inversely to the manner the first fluid deflects fluid through the common discharge passage upon a similar change in flow through the two orifices, so that with increased flow through one of the orifices more flow from one valve enters the common passage 5 and with increased flow through the other orifice less flow from the other valve enters the common discharge passage 5.

The two orifices are provided with fluid through a common duct 14. A controller 15 is installed in the duct to control flow through the duct and hence through both orifices. Thus it is seen that this invention provides precise control of the desired amount of fluid from two sources entering a common passage 5 without the use of mechanically movable flow proportioning devices and simply by controlling fluid flow through duct 14.

The first valve 2 has a divider 4 separating the main discharge passage 5 and the auxiliary discharge passage 6. The divider may be arranged to intercept and proportion the flow from the supply passage 3 in any desired fashion prior to application of control flow through a connection 8 attached to the valve 2 and communicating with control orifice 7. Fluid enters the valve 2 through supply connection 16 attached thereto which communicates with supply passage 3. The flow to be mixed exits the valve through a pipe connection 17 which communicates with discharge passage 5. The second valve 10 has a divider 20 separating the main discharge passage 5 and the auxiliary discharge passage 12. Again the divider may be arranged to intercept and proportion flow from the supply passage 11 in any desired fashion prior to application of control flow through a connection 9 attached to the valve 10 and communicating with control orifice 13. Fluid enters the valve 10 through supply connection 21 attached thereto which communicates with supply passage 11. The flow from valve 10 which is to be mixed also exits the valve through connection 17.

Figure 2:
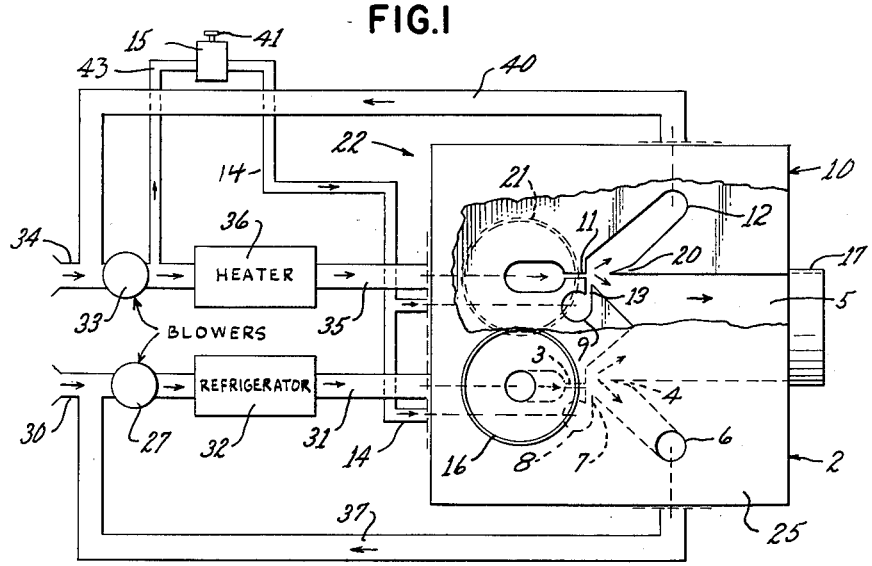
FIG. 2 is a part schematic and part plan view of the system.
Figures 3, 4:
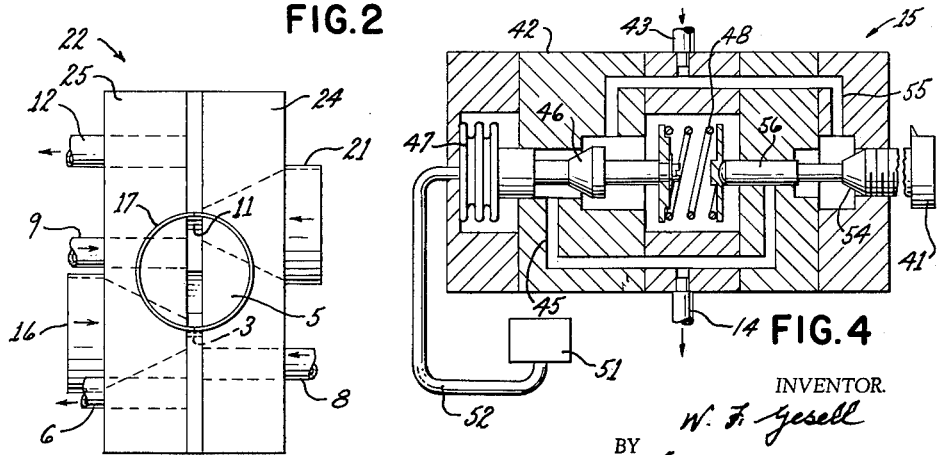
FIG. 3 is an end view of the mixing valves looking into the discharge passage in FIG. 1.
FIG. 4 is a view showing the temperature control arrangement.

The two valves are preferably arranged together in a common compact housing 22, as illustrated in FIG. 3, and made up of three plates fastened together by any siutable means. The center plate 22 has passages and physical geometry as illustrated in FIG. 2 and includes the internal porting for valves 2 and 10. A pair of outside plates 24 and 25 provide side walls which make up the passageways and provide structural rigidity and support for the external connections. Part of plate 25 has been cut away in FIG. 2 to illustrate the passages more clearly.

In applications where the sources of fluid are under pressure and fluid flows through the control orifices under pressure, flow through the control orifices exerts a force on each respective stream of fluid as the fluid flows through each supply passage to deflect the fluid in varying proportions through the main and auxiliary discharge passage of each respective valve depending upon the force applied.

This invention is applicable where fluids having different characteristics are to be mixed in a desired proportion and includes the mixing of air at different temperatures to control the mixed air temperature in a given area. One application of an air temperature control system is temperature control in a motor vehicle 28, as illustrated in FIG. 1. The housing 22, containing valves 2 and 10, is shown installed in the motor vehicle and is provided with air through supply lines 31 and 35 which are connected to supply connections 16 and 21 respectively. The common duct 14, with controller 15 installed therein and on the motor vehicle control panel, is connected to a common source. A pipe assembly 26 attached to connection 17 on the housing 22 conveys the mixed air to the motor vehicle cab.

Flow to the first valve 2 is from a first fluid pressure source, preferably a blower 27, as illustrated in FIG. 2. The blower is attached to and supplied with air through a pipe 30 and increases the pressure thereof before flowing it through another pipe 31 attached to the blower and to the pipe connection 16 on valve 2. A heat exchanger 32 is installed in the pipe 31 to change the temperature of the air coming from the blower. Flow to the second valve is from a second fluid pressure source preferably another blower 33. Blower 33 is supplied with air through a pipe 34 attached thereto before flowing it through another pipe 35 attached to the blower and to the pipe connection 21 on valve 10. Another heat exchanger 36 is installed in the pipe 35 to change the temperature of the air flowing from blower 33. Heat exchanger 36 may be a heater and 32 a refrigerator so that they operate in opposite fashion with one increasing the temperature of the air flowing through it while the other simultaneously decreases the temperature of the air flowing through it.

The flow through each auxiliary passage 6 and 12 could be exhausted, but for increased efficiency of the air temperature control system this flow is preferably recirculated. Flow from the auxiliary passage 6 in valve 2 is preferably recirculated through a pipe 37 which introduces the flow ahead of the blower 27. Likewise flow discharging auxiliary passage 12 in the second valve 10 is preferably recirculated through a pipe 40 which introduces the flow ahead of the blower 33.

In the form of the invention illustrated, the duct 14 which provides flow to the orifices is connected to a suitable pressure source, for example the discharge of blower 33. The controller 15 is installed in this duct for regulating the air flow therethrough. Control of flow through the duct is provided by an automatic temperature control device and a manual knob 41 on the controller 15.

The controller 15, illustrated in FIG. 4, is comprised of housing 42 supplied by line 43 and through duct 14. During automatic operation flow is through line 43, passage 55, past valve element 46, through a passage 45 in the controller, and to control duct 14. The amount of flow through passage 45 and hence to the control orifices is controlled by a spring loaded valve 46 movably installed in the housing 42. The valve 46 is actuated by a bellows 47 attached to the valve and to housing 42. An automatic temperature sensor comprised of a reservoir 51 having good thermal properties and containing a suitable volatile fluid which changes its characteristics within a desired temperature range to move the bellows is installed in a suitable position in the motor vehicle. The reservoir is attached by a conduit 52 to the bellows and as the fluid in the reservoir changes its characteristics it changes the force exerted by the bellows which in turn moves valve 46 to control flow through passage 45 and hence to the control orifices to maintain a desired temperature. The controller is also provided with a manual knob 41 threadedly engaged in the housing 42 and provided with means at its inner end for adjusting the compression of spring 48, and a valve stem 56 which can be positioned so that its right hand edge controls flow through the corresponding portion of passage 45 and to passage 14. Another passage 55 interconnects supply line 43 with the control duct 14 under either automatic or manual control. Thus, turning knob 41 through a first inward movement so compresses spring 48 as to set the response level for automatic operation through controlled flow past valve 46. Further rotation of knob 41 then compresses spring 48 so as to maintain valve 46 closed, thus overriding automatic operation, and then the edge of stem 56 operates for manual control in cooperation with the corresponding end of passage 45. The control of air flow through duct 14 whether accomplished automatically or manually controls flow to the control orifices which control the proportion of air at different temperatures entering discharge passage 5 and thus the temperature in the motor vehicle cab.

Thus it is apparent that in accordance with the present invention a fluid mixing system is provided which in the illustrated embodiment enables accurate control of air temperature in a motor vehicle by using valves with no moving parts. Furthermore the present invention does not require complex flow proportioning devices with many moving parts and mechanical control linkages which are generally required by present systems.

While the form of apparatus herein described constitutes a preferred embodiment of the invention, it is to be understood that the invention is not limited to this precise form of apparatus, and that changes may be made therein without departing from the scope of the invention which is defined in the appended claims.

I claim:
1. A fluid mixing system comprising,
   first valve means having a supply passage adapted to be connected to a first fluid pressure source for generating a fluid stream,
   a main discharge passage and an auxiliary discharge passage in said valve means for receiving fluid from said supply passage, said valve means providing an orifice arranged to flow fluid in a direction generally transverse to said stream to cause said stream to flow in an increased proportion through said main discharge passage upon increased flow through said orifice,
   second valve means having a second supply passage and adapted to be connected to a second fluid pressure source for generating a second fluid stream of different fluid characteristics from the first source,
   a second main discharge passage and a second auxiliary discharge passage in said second valve means for receiving fluid from said second supply passage,
   said second valve means providing an orifice arranged to flow fluid in a direction generally transverse to said second stream to cause said second stream to flow in an increased proportion through said second main discharge passage upon decreased flow through said orifice in said second valve means,
   means for combining the flow from said main discharge passages,
   a common fluid duct connected to both of said orifices and providing a flow of fluid through said orifices,
   and means for controlling the amount of flow through said duct to increase the proportion of flow of fluid from either of said fluid pressure sources through a main discharge passage while decreasing the flow of fluid from the other fluid pressure source through the other main discharge passage.

2. The system as set forth in claim 1 in which the means for controlling the amount of flow through said duct comprises a temperature responsive device which automatically senses the temperature of the combined fluids and controls said flow through said duct.

3. The system as set forth in claim 1 in which the means for controlling the amount of flow through said duct comprises a manually adjustable controller.

4. A fluid mixing system comprising,
   first valve means having a supply passage adapted to be connected to a first fluid pressure source for generating a fluid stream,
   a main discharge passage and an auxiliary discharge passage in said valve means for receiving fluid from said supply passage,
   said valve means providing an orifice arranged to flow fluid in a direction generally transverse to said stream to cause said stream to flow in an increased proportion through said main discharge passage upon increased flow through said orifice,
   second valve means having a second supply passage and adapted to be connected to a second fluid pressure source for generating a second fluid stream of different fluid characteristics from the first source,
   a second main discharge passage and a second auxiliary discharge passage in said second valve means for receiving fluid from said second supply passage,
   said second valve means providing an orifice in said second conduit arranged to flow fluid in a direction generally transverse to said second stream to cause said second stream to flow in an increased proportion through said second main discharge passage upon decreased flow through said orifice in said second valve means, means for combining the flow from said main discharge passage, a common fluid duct connected to both of said orifices and providing a flow of fluid through said orifices, means for controlling the amount of flow through said duct to increase the proportion of flow of fluid from either of said fluid pressure sources through a main discharge passage while decreasing the flow of fluid from the other fluid pressure source through the other main discharge, and means connected to one of said auxiliary passages for returning the fluid supplied thereto back to its respective fluid pressure source.

5. An air mixing system comprising, first valve means having a supply passage adapted to be connected to a first air pressure source for generating an air stream, a main discharge passage and an auxiliary discharge passage in said valve means for receiving air from said supply passage, said valve means providing an orifice arranged to flow air in a direction generally transverse to said stream to cause said stream to flow in an increased proportion through said main discharge passage upon increased flow through said orifice, second valve means having a second passage adapted to be connected to a second air pressure source for generating a second air stream at a different temperature from the first source, a second main discharge passage and a second auxiliary discharge passage in said second valve means for receiving air from said second supply passage, said second valve means providing an orifice arranged to flow air in a direction generally transverse to said second stream to cause said second stream to flow in an increased proportion through said second main discharge passage upon decreased flow through said orifice in said second valve means, means for combining the flow from said main discharge passages, a common air duct connected to both of said orifices and to one of said air pressure sources and providing a flow of fluid through said orifices, and means for controlling the amount of flow through said duct to increase the proportion of flow of air from either of said air pressure sources through a main discharge passage while decreasing the flow of air from the other air pressure source through the other main discharge passage to control the temperature of the combined air.

6. A fluid mixing system comprising an air pressure source, a heat exchanger connected to said air pressure source, first valve means having a supply passage connected to said heat exchanger for generating an air stream, a main discharge passage and an auxiliary discharge passage in said valve means for receiving air from said supply passage, said valve means providing an orifice arranged to flow air in a direction generally transverse to said stream to cause said stream to flow in an increased proportion through said main discharge passage upon increased flow through said orifice, second valve means having a second supply passage connected to said air pressure source for generating a second air stream, a second main discharge passage and a second auxiliary discharge passage in said second valve means for receiving air from said second supply passage, said second valve means providing an orifice arranged to flow air in a direction generally transverse to said second stream to cause said second stream to flow in an increased proportion through said second main discharge passage upon decreased flow through said orifice in said second valve means, means for combining the flow from said main discharge passages, a common fluid duct connected to both of said orifices and to said pressure source for providing a flow of air through said orifices, and means for controlling the amount of flow through said duct to increase the proportion of flow of fluid from either of said supply passages through a main discharge passage while decreasing the flow of fluid from the other supply passage through the other main discharge passage, 7. An air mixing system comprising, a pressure source for supplying air under pressure, a heater connected to said pressure source for increasing the temperature of the air as it flows through the heater, first valve means having a supply passage connected to said heater for generating an air stream, a main discharge passage and an auxiliary discharge passage in said valve means for receiving air from said supply passage, said valve means providing an orifice arranged to flow air in a direction generally transverse to said stream to cause said stream to flow through said main discharge passage upon increased flow through said orifice, a refrigerator connected to said pressure source for decreasing the temperature of the air as it flows through the refrigerator, second valve means having a second supply passage connected to said refrigerator for generating a second air stream, a second main discharge passage and a second auxiliary discharge passage in said second valve means for receiving air from said second supply passage, said second valve means providing an orifice arranged to flow air in a direction generally transverse to said second stream to cause said second stream to flow in an increased proportion through said second main discharge passage upon decreased flow through said orifice in said second valve means, means for combining the flow from said main discharge passages, a common fluid duct connected to both of said orifices and to said pressure source for providing a flow of fluid through said orifices, and means for controlling the amount of flow through said duct to increase the proportion of flow of fluid from either of said supply passages through a main discharge passage while decreasing the flow from the other supply passage through the other main discharge passages, 8. An air mixing system comprising, a pressure source for supplying air under pressure, a heater connected to said pressure source for increasing the temperature of the air as it flows through the heater, first valve means having a supply passage connected to said heater for generating an air stream, a main discharge passage and an auxiliary discharge passage in said valve means for receiving air from said supply passage, said valve means providing an orifice arranged to flow air in a direction generally transverse to said stream to cause said stream to flow through said main discharge passage upon increased flow through said orifice, a refrigerator connected to said pressure source for decreasing the temperature of the air as it flows through the refrigerator, second valve means having a second supply passage connected to said refrigerator for generating a second air stream, a second main discharge passage and a second auxiliary discharge passage in said second valve means for receiving air from said second supply passage, said second valve means providing an orifice in said second conduit arranged to flow air in a direction generally transverse to said second stream to cause said second stream to flow through said second main discharge passage upon flow through said orifice in said second valve means, means for combining the flow from said main discharge passages, a common fluid duct connected to both of said orifices and to said pressure source for providing a flow of fluid through said orifices, means for controlling the amount of flow through said duct to increase the proportion of flow of fluid from either of said supply passages through a main discharge passage while decreasing the flow of fluid from the other supply passage through the other main discharge passage, and a pipe attached to the auxiliary discharge passage of each conduit and to its respective heater and refrigerator inlet to recirculate the air flow from each auxiliary discharge passage.

9. The system as set forth in claim 7 in which the means for controlling the amount of flow through said duct comprises a temperature responsive device which automatically senses the temperature of the combined air stream and controls said flow through said duct.

10. The system as set forth in claim 7 in which the means for controlling the amount of flow through said duct comprises a manually adjustable controller.

References Cited by the Examiner

UNITED STATES PATENTS

| | | | |
|---|---|---|---|
| 2,835,449 | 5/58 | Joesting | 236—13 |
| 3,016,063 | 1/62 | Hausmann | 137—83 |
| 3,080,886 | 5/63 | Severson | 137—83 |
| 3,091,393 | 5/63 | Sparrow | 236—12 |

JAMES W. WESTHAVER, *Primary Examiner.*